(12) United States Patent
Hayton

(10) Patent No.: US 9,581,048 B2
(45) Date of Patent: Feb. 28, 2017

(54) PANEL ATTACHMENT SYSTEM

(71) Applicant: ROLLS-ROYCE PLC, London (GB)

(72) Inventor: Paul Robert Hayton, Bristol (GB)

(73) Assignee: ROLLS-ROYCE plc, London (GB)

( * ) Notice: Subject to any disclaimer, the term of this patent is extended or adjusted under 35 U.S.C. 154(b) by 169 days.

(21) Appl. No.: 14/319,460

(22) Filed: Jun. 30, 2014

(65) Prior Publication Data
US 2015/0028166 A1    Jan. 29, 2015

(30) Foreign Application Priority Data

Jul. 24, 2013   (GB) .................................. 1313172.7

(51) Int. Cl.
| | | |
|---|---|---|
| F01N 13/18 | (2010.01) | |
| F16L 3/16 | (2006.01) | |
| F02K 3/00 | (2006.01) | |
| F02K 1/80 | (2006.01) | |
| F01D 25/10 | (2006.01) | |

(Continued)

(52) U.S. Cl.
CPC ............. *F01D 25/30* (2013.01); *F01D 25/12* (2013.01); *F16L 3/16* (2013.01); *F01N 13/1811* (2013.01); *F02C 7/20* (2013.01); *F02K 1/80* (2013.01); *F02K 1/82* (2013.01); *F05D 2260/231* (2013.01); *F05D 2260/30* (2013.01); *F24F 13/20* (2013.01); *Y02T 50/672* (2013.01); *Y02T 50/675* (2013.01)

(58) Field of Classification Search
CPC .......... F01D 25/12; F01D 25/30; F01D 25/28; F01D 25/24; F01N 13/1811; F04D 2260/30; F05D 2260/31; F05D 2260/231; F16L 3/16; F24F 13/20; F02K 1/80; F02K 1/82; F02K 3/00; F02C 7/20

USPC ......... 248/58, 60, 554, 222.14; 60/776, 772, 60/800, 226.1, 752, 766, 796; 415/196; 49/465, 506
See application file for complete search history.

(56) References Cited

U.S. PATENT DOCUMENTS 3,848,697 A  *  11/1974  Jannot ..................... F02K 1/827
                                                                  181/220
4,864,818 A     9/1989  Taylor
(Continued)

FOREIGN PATENT DOCUMENTS

| EP | 1 849 986 A1 | 10/2007 |
|---|---|---|
| GB | 937698 A | 9/1963 |

OTHER PUBLICATIONS

Jan. 22, 2014 Search Report issued in British Patent Application No. GB1313172.7.

*Primary Examiner* — Tan Le
(74) *Attorney, Agent, or Firm* — Oliff PLC

(57) ABSTRACT

A panel attachment system includes a panel, a casing, and a plurality of hangers that enable the panel to be secured in a pre-determined position relative to the casing. Each of the hangers is formed as an elongate strip having a single corrugation, with each hanger having a center portion, a first end portion, and an opposite second end portion. The plurality of hangers are positioned in length-wise alignment, with the first end portion of each hanger being attached to the second end portion of an adjoining hanger. The attached first and second end portions are secured to the casing, and the center portion of each hanger is secured to the panel to thereby secure the panel in a pre-determined position relative to the casing.

9 Claims, 3 Drawing Sheets

(51) Int. Cl.
    *F01D 25/30*     (2006.01)
    *F01D 25/12*     (2006.01)
    *F24F 13/20*     (2006.01)
    *F02K 1/82*     (2006.01)
    *F02C 7/20*     (2006.01)

(56) References Cited

U.S. PATENT DOCUMENTS

| | | | | |
|---|---|---|---|---|
| 5,069,034 | A * | 12/1991 | Jourdain | F02K 1/822 |
| | | | | 60/752 |
| 6,041,590 | A * | 3/2000 | Hayton | F02K 1/822 |
| | | | | 60/766 |
| 6,199,371 | B1 * | 3/2001 | Brewer | F01D 25/26 |
| | | | | 60/766 |
| 7,966,823 | B2 * | 6/2011 | Koshoffer | F02K 1/386 |
| | | | | 60/766 |
| 2010/0205930 | A1 | 8/2010 | Conete et al. | |
| 2015/0028166 | A1 * | 1/2015 | Hayton | F01D 25/12 |
| | | | | 248/60 |

\* cited by examiner

PANEL ATTACHMENT SYSTEM

FIELD OF THE INVENTION

The present invention relates to a panel attachment system and particularly, but not exclusively, to a panel attachment system for an exhaust gas duct.

BACKGROUND TO THE INVENTION

In aircraft propulsion systems liner panels are used to isolate the hot gas stream from casings and form a guided path for the cooling air flow. The liner is supported and held in position by supports referred to in this document as hangers. The hangers span the gap between the liner and the case. The air in this gap is used to supply cooling air to cool the liner panel. The cooling air in the cooling passage is at a higher static pressure than the main core streams (inside the liner panel) so the cooling air flows from the cooling air side to the core stream side.

In aircraft propulsion systems liner panels are usually tubular in shape and the gas pressure is contained by hoop stress in the skin of the liner panel. Hangers then simply locate the tube and carry the weight of the tube.

In certain applications the liner panel may not be tubular but may be flat or may transition from round to a polygon.

Liners having these shapes however do not resist the pressure of the gas stream by generating hoop stress in the liner as does a tubular section. The pressure must be reacted though hangers which can transmit the load to the casings.

The exhaust duct for a gas turbine engine is conventionally a circular duct which connects to the turbine stage outlet of the engine. The use of a circular duct is convenient since it can be readily connected to the turbine outlet of the engine. In addition, thermal expansion of the exhaust duct resulting from the heat of the exhaust gas flow may be readily accommodated by the radial growth of the exhaust duct.

However, in many gas turbine engine installations it is desirable for the exit portion of the exhaust duct to be non-circular because this can make the mechanical installation of the exhaust duct into its supporting structure easier and more convenient.

In particular it is advantageous for the exhaust duct to be rectilinear in cross-section to facilitate the mounting of the exhaust duct within its surrounding structure.

Due to the need to accommodate dimensional changes in the exhaust duct resulting from the hot exhaust gases passing through the exhaust duct it is known to provide a duct mounting arrangement that independently accommodates both axial and lateral growth of the exhaust duct resulting from thermal expansion of the duct. Such mounting arrangements are required to accommodate movement of the duct both axially and laterally and can be mechanically complicated.

STATEMENTS OF INVENTION

According to a first aspect of the present invention there is provided a panel attachment system comprising:
 a panel;
 a casing; and
 a plurality of hangers, each hanger being formed as an elongate strip having a single corrugation, each hanger having a centre portion, a first end portion and an opposite second end portion,
 wherein the plurality of hangers are positioned in lengthwise alignment, with the first end portion of each hanger being attached to the second end portion of an adjoining hanger, the attached first and second end portions being secured to the casing, and the centre portion of each hanger being secured to the panel, to thereby secure the panel in a pre-determined position relative to the casing.

The use of an elongate and corrugated hanger enables the panel to be positioned securely relative to the casing while providing little restriction to gas flow in the space between the panel and the casing.

This makes the panel attachment system of the invention simple and convenient to use.

The hangers may be simply manufactured from flat strip material stock which enables the panel attachment system to be produced easily and at low cost. This makes the system advantageous for a user.

Optionally, the centre portion comprises a first end and a second end, and each of the first and second end portions are connected to respective ones of the first end and the second end by corresponding first and second angled portions.

The hangers are formed as top hat sections and are attached sequentially to adjoining hangers to form the attachment system. This enables the system to cater for panels of differing size while requiring a single hanger design. This makes the attachment system simple and cost effective to produce.

Optionally, the panel attachment system further comprises a plurality of rows of hangers Multiple rows of hangers may be employed across a width of a panel. This enables the attachment system of the invention to be used with panels having varying width so making the system convenient for a user.

Optionally, the first end portion of one hanger overlaps and is attached to the second end portion of the adjoining hanger by a removable fastener.

The use of a removable fastener makes the assembly and disassembly of the attachment system easier and more convenient for a user.

Optionally, the first end portion of one hanger overlaps and is attached to the second end portion of the adjoining hanger by a threaded fastener.

Optionally, the centre portion is secured to the panel by a joggled plate, the joggled plate being secured to the panel and extending normal to and across the centre portion to thereby constrain the centre portion between the joggled plate and the panel.

The joggled plate takes the form of a short strap that extends across the centre portion and clamps the centre portion against the inner surface of the panel.

Optionally, the centre portion is constrained normal to the plane of the strip.

By constraining the centre portion of the hanger in a plane normal to the plane of the strip from which the hanger is formed, the position of the panel relative to the casing can be controlled while allowing movement of the panel relative to the casing in the plane of the strip.

This is important because it allows for dimensional changes in the panel resulting from thermal expansion of the panel to be accommodated while maintaining the position of the hanger relative to the casing. In other words, the in-plane movement of the panel is accommodated by the panel attachment system while across-plane movement is prevented. This allows the panel attachment system of the invention to be used in situations where the panel experiences significant thermal expansion, for example where the panel is a liner within an exhaust duct in a gas turbine engine.

Optionally, the joggled plate is attached to the casing by at least one removable fastener.

The use of a fastener allows for the possibility of the panel being removed from the panel attachment system for maintenance or repair.

Optionally, the panel attachment system further comprises a plurality of rows of hangers disposed across a surface of the casing.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
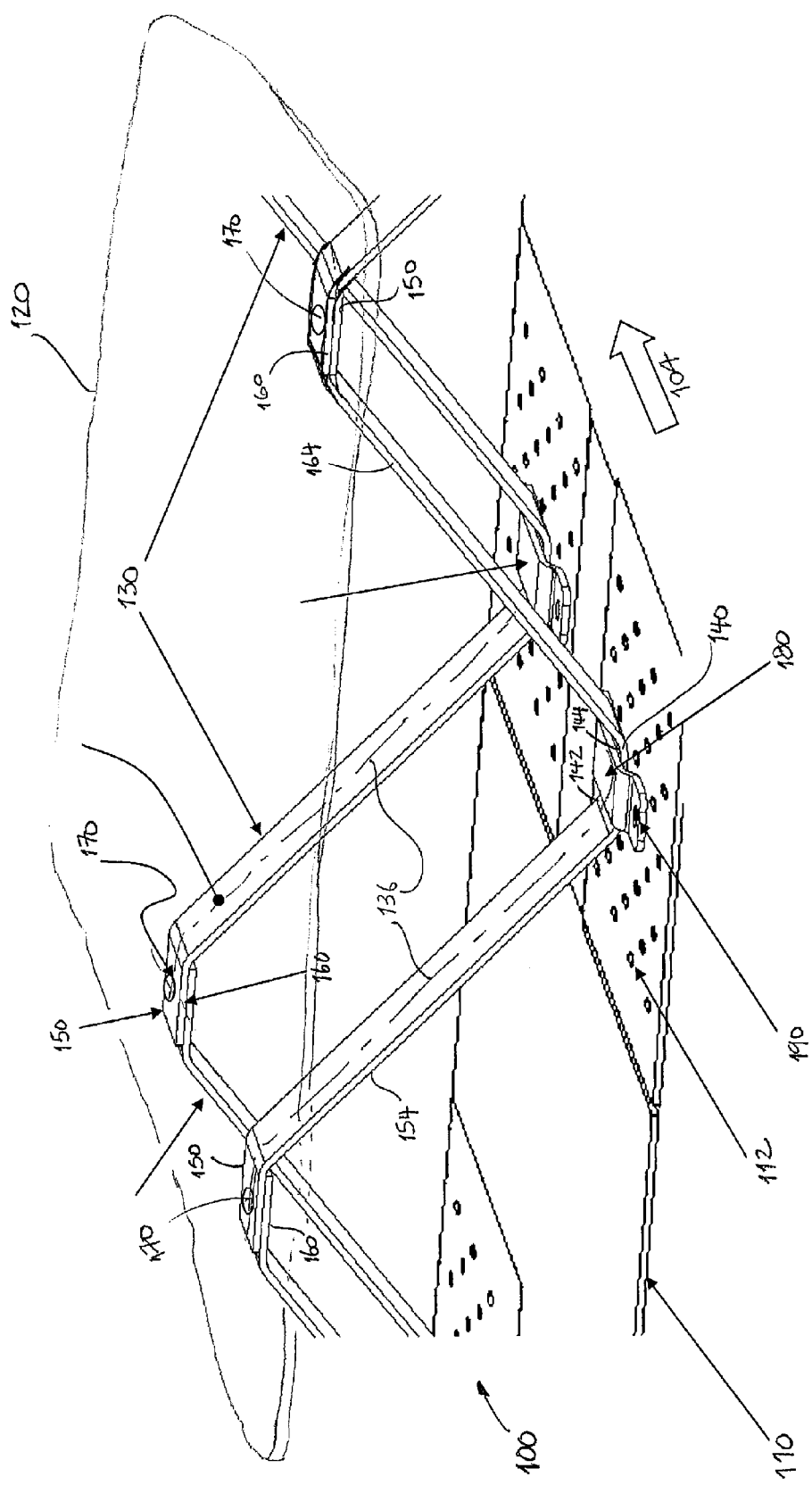
FIG. 1 shows a schematic perspective view of a panel attachment system according to the present invention.
Figure 2:
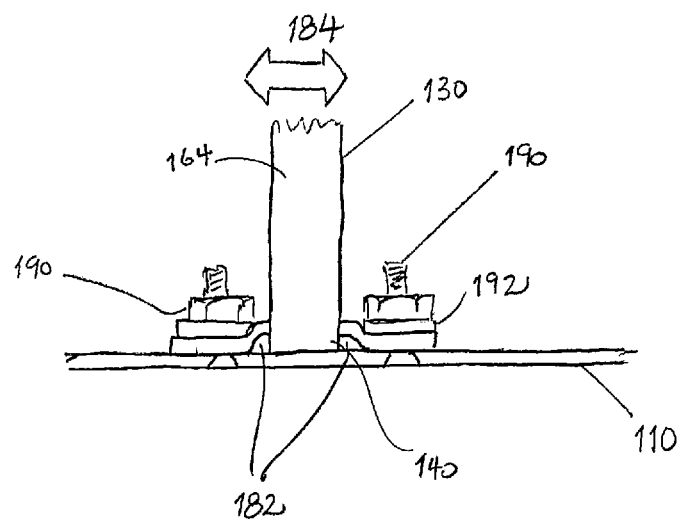
FIG. 2 shows a partial side view of the centre portion attachment of FIG. 1.
Figure 3:
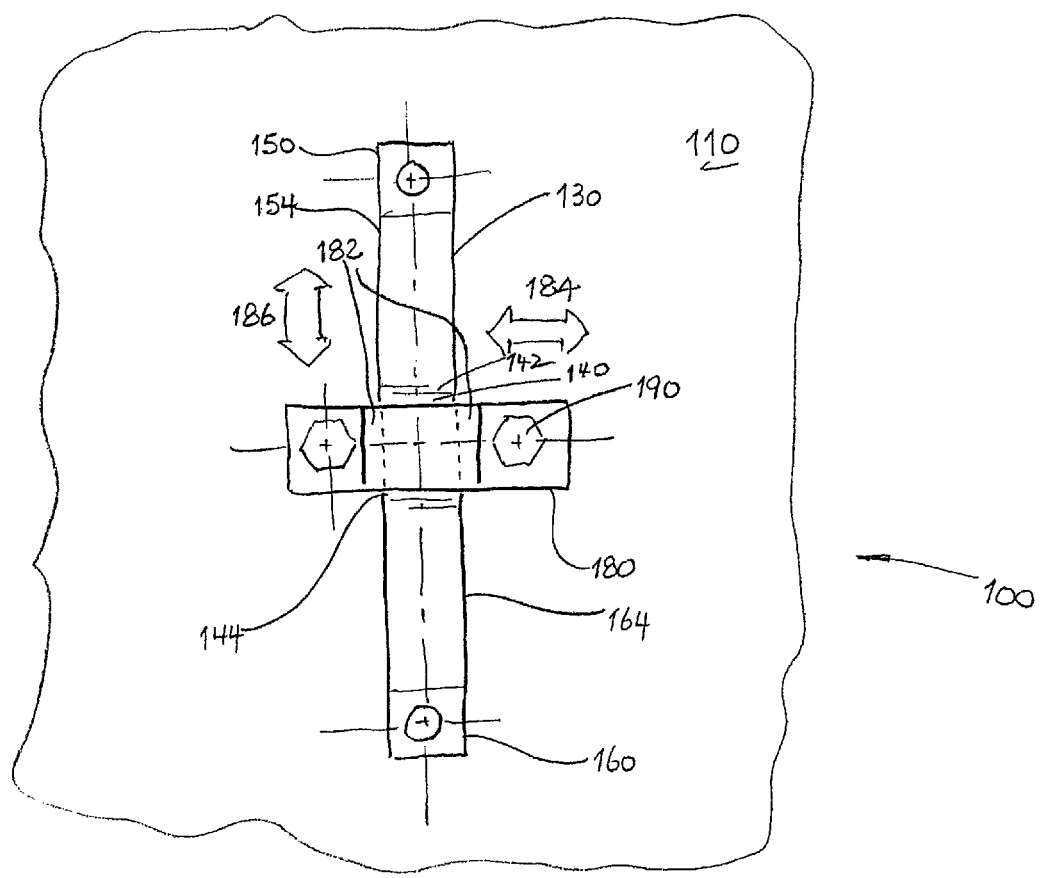
FIG. 3 shows a partial plan view of the centre portion attachment of FIG. 1.

Referring to FIGS. 1 to 3, a panel attachment system according to an embodiment of the invention is designated generally by the reference numeral 100.

The panel attachment system 100 comprises a panel 110, a casing 120 and a plurality of hangers 130. In the present embodiment the panel 110 is the liner panel 110 within an exhaust system casing 120 for a gas turbine engine (not shown) for an aircraft. In this embodiment a cooling gas flow 104 passes between the panel 110 and the casing 120. This gas flow 104 is intended to cool the panel 110 which is exposed to an exhaust gas flow (not shown).

In the present embodiment the panel 110 is provided with perforations 112. The perforations 112 extend over only part of the surface of the panel 110.

Each of the plurality of hangers 130 is formed as an elongate strip having a single corrugation 134. Each hanger 130 has a centre portion 140, a first end portion 150 and an opposite second end portion 160. The centre portion 140 itself has a first end 142 and a second end 144. The first end 142 of the centre portion 140 is connected to the first end portion 150 by a first angled portion 154. Similarly, the second end 144 of the centre portion 140 is connected to the second end portion 160 by a second angled portion 164.

In this embodiment the hanger 130 is formed as flat strip having a single corrugation. In other words each hanger 130 has a 'top hat' sectional profile in which the centre portion 140 and first and second end portions are planar and substantially parallel to one another.

The hangers 130 are oriented such that a longitudinal axis 136 of the hanger 130 is substantially normal to the direction of gas flow 104 between the panel 110 and the casing 120. In this way the hanger 130 presents the minimum of flow disruption to the gas flow 104 which in turn improves the cooling efficiency of the gas flow 104.

In the present embodiment each of the hangers 130 is formed from titanium alloy strip material. However in other embodiments of the invention the hangers 130 may be formed from another metal or metal alloy. Alternatively, the hangers 130 may be formed from a fibre reinforced composite material that has been moulded to the corrugated profile.

The plurality of hangers 130 are arranged in a lengthwise arrangement with the longitudinal axis of adjoining hangers 130 being aligned with one another. The first end portion 150 of one hanger 130 is attached to the second end portion 160 of an adjoining hanger 130. The attached first and second end portions 150,160 of adjoining hangers 130 are then attached to the casing 120.

In this arrangement the first and second end portions 150,160 are attached to one another by means of a threaded fastener 170 such as a nut and bolt. In other arrangements the first and second end portions 150,160 may be attached to one another by a rivet (not shown) or another mechanical fastener.

In the embodiment shown in FIG. 1, the panel 110 is secured to the casing 120 by two rows of hangers 130. In other arrangements, there may be only one row of hangers 130. Alternatively there may be three or more rows of hangers 130 securing the panel 110 to the casing 120.

The centre portion 140 of each hanger 130 is secured to the panel 110 with a joggled plate 180. The joggled plate 180 is formed as a short strap that extends across the centre portion 140 and is attached at each end to the panel 110.

As shown in FIGS. 2 and 3 the joggled plate 180 is attached at each end to the panel 110 by a removable fastener 190 with a corresponding washer 192. In this arrangement the removable fastener is a threaded bolt and nut. In other arrangements, the removable fastener 190 may be a rivet or other mechanical fastening means.

In this way the centre portion 140 of the hanger 130 is trapped between the joggled plate 180 and the panel 110. A gap 182 is provided on either side of the centre portion 140 proximal to each of the removable fasteners 190. This gap 182 provides for in-plane movement of the panel 110 resulting from thermal expansion of the panel 110 caused by heat energy transferred to the panel 110 from the exhaust gas (not shown).

In this way lateral thermal growth 184 and longitudinal thermal growth 186 of the panel 110 is accommodated by the panel attachment system 100 of the invention whilst maintaining the panel 110 in a predetermined spacing distance from the casing 120.

The panel attachment system 100 of the invention is shown as securing a planar panel 110 to a casing 120. However, the panel attachment system 100 may equally be applied to the mounting of a panel 110 having a curved surface profile to a respective casing 120.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A panel attachment system comprising:
a panel;
a casing; and a plurality of hangers, each hanger being formed as an elongate strip having a single corrugation, each hanger having a center portion, a first end portion and an opposite second end portion, wherein the plurality of hangers are positioned in lengthwise alignment, with the first end portion of each hanger being attached to the second end portion of an adjoining hanger, the attached first and second end portions being secured to the casing, and the center portion of each hanger being secured to the panel, to thereby secure the panel in a pre-determined position relative to the casing, and wherein the center portion is secured to the panel by a joggled plate, the joggled plate being a stepped plate comprising a recessed mid portion, the center portion being accommodated within the recessed mid portion, the joggled plate being secured to the panel and extending normal to and across the center portion to thereby constrain the center portion between the joggled plate and the panel.

2. The panel attachment system as claimed in claim 1, wherein the center portion comprises a first end and a second end, and each of the first and second end portions are connected to respective ones of the first end and the second end by corresponding first and second angled portions.

3. The panel attachment system as claimed in claim 1, further comprising a plurality of rows of hangers.

4. The panel attachment system as claimed in claim 1, wherein the first end portion of one hanger overlaps and is attached to the second end portion of the adjoining hanger by a removable fastener.

5. The panel attachment system as claimed in claim 1, wherein the first end portion of one hanger overlaps and is attached to the second end portion of the adjoining hanger by a threaded fastener.

6. The panel attachment system as claimed in claim 1, wherein the center portion is constrained normal to the plane of the strip.

7. The panel attachment system as claimed in claim 1, wherein the joggled plate is attached to the panel by at least one removable fastener.

8. The panel attachment system as claimed in claim 1, comprising a plurality of rows of hangers disposed across a surface of the casing.

9. The panel attachment system as claimed in claim 1, wherein the joggled plate constrains the center portion between the joggled plate and the panel while permitting relative movement between the center portion and the panel.

* * * * *